United States Patent [19]
Murphy

[11] Patent Number: 5,692,815
[45] Date of Patent: Dec. 2, 1997

[54] COMPUTER MOUSE PAD AND ITEM HOLDER

[76] Inventor: Kevin M. Murphy, 1990 Del Amo Blvd., Suite A, Torrance, Calif. 90501

[21] Appl. No.: 638,948

[22] Filed: Apr. 24, 1996

[51] Int. Cl.⁶ ................................................ A47B 97/00
[52] U.S. Cl. ............... 312/283; 312/231; 248/346.01; 248/918; 248/118; 108/26; 108/43; D14/114
[58] Field of Search ................ 313/283, 231; 108/43, 25, 26; D14/114; 248/118, 118.1, 346.01, 918

[56] References Cited

U.S. PATENT DOCUMENTS

| 186,875 | 1/1877 | Price | 108/43 |
|---|---|---|---|
| D. 309,450 | 7/1990 | Hassel et al. | D14/114 |
| 2,008,078 | 7/1935 | Martin | 108/26 |
| 2,754,167 | 7/1956 | Young | 108/26 |
| 3,255,719 | 6/1966 | Klavins | 108/26 |
| 4,735,150 | 4/1988 | Roberts | 312/231 X |
| 4,765,583 | 8/1988 | Tenner | 108/43 X |
| 4,892,334 | 1/1990 | Sinclair | 313/231 X |
| 4,957,235 | 9/1990 | Beno et al. | 108/25 X |
| 5,022,170 | 6/1991 | House | 40/358 X |
| 5,340,075 | 8/1994 | Schriner | 248/118 X |
| 5,443,237 | 8/1995 | Stadmauer | 248/918 X |
| 5,460,102 | 10/1995 | Pasmanick | 108/43 |
| 5,492,298 | 2/1996 | Walker | 249/918 X |
| 5,542,637 | 8/1996 | Schriver | 248/918 X |
| 5,556,061 | 9/1996 | Dickie | 248/918 |

Primary Examiner—Peter M. Cuomo
Assistant Examiner—James O. Hansen
Attorney, Agent, or Firm—James G. O'Neill

[57] ABSTRACT

A mouse pad and item holder having a top surface with a mouse tracking surface, that may be a textured surface or a separate mouse pad held in a recessed area, is supported by a shaped base having a number of openings formed between a bottom surface of the base and the top surface of the holder to allow various items to be inserted into and removed from drawers, dispensers, trays and the like, movably held in the base.

16 Claims, 1 Drawing Sheet

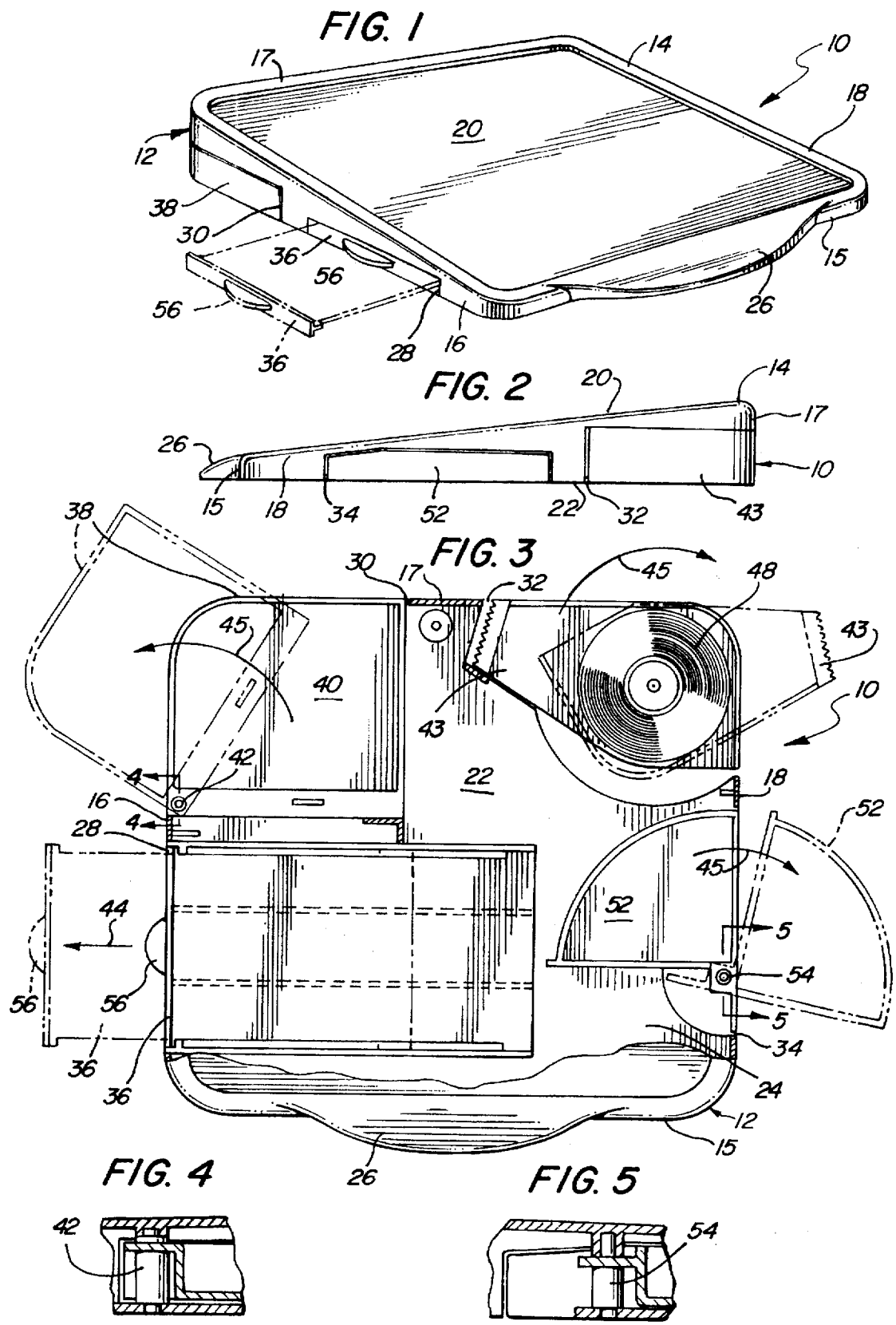

COMPUTER MOUSE PAD AND ITEM HOLDER

BACKGROUND OF THE INVENTION

1. Field of the Invention

This invention relates generally to computer mouse pads, and more particularly, to a computer mouse pad and item holder having a plurality of holding areas and drawers therein.

2. Description of Related Art

Numerous types of computer mouse pads are known to allow a computer user to properly operate a mouse connected to a computer, such as a personal computer ("PC"). Such mouse pads come in many different sizes and shapes, and are a necessity when using today's software with the available computers.

However, such mouse pads take up precious space on already crowded desks or work spaces containing the computer and accessories being used. Therefore, mouse pad holders have been designed to hold specific mouse pads and other items.

One such prior art mouse pad and holder having a number of external holding trays is shown in U.S. Design Pat. No. 309,450.

In U.S. Pat. No. 5,002,170 there is shown a multi-layer desk pad which includes a tray formed as an inset, to retain desktop articles.

While the foregoing described prior art devices provide some limited improvements in the mouse pad holder and desk pad arts, there remains the need in the art for a combination mouse pad and item holder that conveniently supports a mouse, and which also includes a number of built-in holding areas and drawers for retaining useful articles.

SUMMARY OF THE INVENTION

Accordingly, it is a general object of the present invention to provide an improved mouse pad. It is a particular object of the present invention to provide an improved mouse pad and item holder having multiple features. It is a still more particular object of the present invention to provide an improved mouse pad and item holder having a plurality of holding areas for holding useful items therein. It is yet a more particular object of the present invention to provide an improved mouse pad and item holder having a plurality of holding areas and drawers for holding useful items therein. It is a further particular object of the present invention to provide an improved mouse pad and item holder having drawers which swing in and out of the holder. And, it is still a further particular object of the present invention to provide an improved mouse pad and desk item holder having a body with a slanted upper face for supporting a mouse thereon and a plurality of movable drawers formed interiorly of the body.

In accordance with one aspect of the present invention, there is provided a combination mouse pad and item holder having a body with an upper surface having a mouse tracking portion thereon. The upper surface is secured to a plurality of sides having openings formed therein for receiving drawers or other useful items.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

FIG. 1 is a perspective view of a preferred embodiment of a mouse pad and item holder of the present invention, having a base supporting a mouse tracking surface on the top thereof, with a bottom surface resting on a working surface;

FIG. 2 is a side elevational view of the mouse pad and item holder of FIG. 1;

FIG. 3 is a top partial sectional plan view through the base of FIG. 1, showing a plurality of separate areas or compartments having cards or drawers held therein;

FIG. 4 is a partial sectional view take along line 4—4 of FIG. 3; and

FIG. 5 is a partial sectional view take along line 5—5 of FIG. 3.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a description of an improved mouse pad and item holder 10.

The mouse pad and item holder 10 has a base or body 12 with a top surface 14 and a plurality of sides 15, 16, 17, 18. The base 12 can be of any desired size, and made from any readily available materials, such as metals or plastics, and is assembled or manufactured, in any desired or known manner. The top surface 14 includes a mouse tracking area 20 formed thereon for supporting and allowing use of a computer mouse (not shown). The mouse tracking area 20 may take any desired form or configuration, such as a laminate textured surface, made from nylon, a scratch resistant vinyl (SRV), secured or adhered to the top surface 14, in any conventional manner. Or, area 20 may be a recessed area formed on surface 14, for removably receiving a separate mouse pad, such as a photo mouse pad of the type disclosed and claimed in applicant's copending application, Ser. No. 08/577,775, filed Dec. 22, 1995.

The mouse pad and item holder 10, also preferably includes a bottom surface 22 secured to the sides 15–18, to form a hollow interior 24. In the preferred embodiment of the mouse pad and item holder shown, the top surface slants, or is angled at about 5 to 15 degrees to enable a computer mouse to be used more comfortably thereon, and to provide a low profile front side or portion 15. If desired, front surface 15 may be curved outwardly as at 26, to provide a palm rest, for the comfort and safety of a user.

As shown in the drawings, the hollow interior 24 of base 12 has a plurality of compartments formed therein, accessible through various shaped openings 28, 30, 32, 34 formed through various sides of the base. The compartments may hold any number of useful items, or may be provided with drawers, for holding or supporting useful articles, normally found in and around a desk therein. Or, the compartments may be formed to support or hold dispenser means of some type therein. For example, by way of illustration and not for reasons of limitation, the base 12 may be provided with a card 36, such as a speed dial card, slidably mounted in slotted opening 28. Further examples of dispensers or drawers which may be used in the base 12, are as follows: a tray 38, for holding Post-it® or other type of removable notes or paper 40 may be either slidably mounted in opening 30, or may be rotatably mounted about a bearing or post means 42 in the opening 30; a dispenser means 43, such as a tape dispenser having a tape 48 thereon, may be either slidably mounted in opening 32, or rotatably mounted about a bearing or post means 50 in the opening 32; and an empty tray 52, such as a substantially triangular tray for holding paper clips or other small desk-type items may be either slidably mounted in opening 32, or rotatably mounted about a bearing or post means 54 in the opening 34.

In use, the mouse pad and item holder 10 will be supported on a flat work surface with a computer mouse on mouse tracking surface 20. The speed card dial card 36 may be inserted and removed from its slit-like opening 28, in the direction of arrow 44, by a finger gripping portion 56, while any or all of the dispensers or trays 38, 43 and 52 may be slid or rotated into and out of the base 12 through the openings 30, 32 and 34, in the direction of arrows 45, by pressing and/or pulling on the same, when it is felt necessary to use the same.

It, therefore, can be seen that the present invention provides a novel mouse pad and item holder which provides a pleasing appearance and which allows various items to be inserted into and removed from dispensers, trays, or the like, rotatably or slidably mounted in the base thereof. The mouse pad and item holder of the present invention is easily used, and provides additional convenient storage for items normally stored elsewhere in and around a desktop or a computer.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A mouse pad and item holder comprising, in combination:
   a base having a flat bottom surface for supporting said mouse pad and item holder on a flat support surface, a top surface and a plurality of side surfaces;
   a mouse tracking area formed on said top surface for supporting and operating a computer mouse thereon;
   a plurality of openings formed in said plurality of side surfaces;
   a plurality of item holding means releasably held in said plurality of openings for movement into and out of said base; and
   at least one of said item holding means being a card slidably held in one of said plurality of openings, and the remainder of said plurality of item holding means comprising trays, rotatably movable out of their respective openings in said side surfaces.

2. The mouse pad and item holder of claim 1 wherein said top surface slopes from a high point at one side surface to a low point at an opposed side surface.

3. The mouse pad and item holder of claim 2 wherein said mouse tracking area is a separate mouse pad supported in a recessed area formed in said top surface.

4. The mouse pad and item holder of claim 2 wherein said mouse tracking area is a laminate textured surface secured to said top surface.

5. The mouse pad and item holder of claim 1 wherein said mouse tracking area is a separate mouse pad supported in a recessed area formed in said top surface.

6. The mouse pad and item holder of claim 5 wherein said top surface slopes from a high point at one side surface to a low point at an opposed side surface with a palm support formed on said base at said low point.

7. The mouse pad holder of claim 6 wherein said slope of said top surface is at an angle of between 5 and 15 degrees.

8. The mouse pad and item holder of claim 1 wherein said mouse tracking area is a laminate textured surface secured to said top surface.

9. The mouse pad and item holder of claim 8 wherein said top surface slopes from a high point at one side surface to a low point at an opposed side surface with a palm support formed on said base at said low point.

10. The mouse pad holder of claim 9 wherein said top surface is sloped at an angle of between 5 and 15 degrees.

11. A mouse pad and item holder comprising, in combination:
    a hollow base having a flat bottom surface for supporting said mouse pad and item holder on a flat support surface, a top surface and a plurality of side surfaces forming a substantially hollow interior;
    said top surface having a mouse tracking area formed thereon for supporting and operating a computer mouse thereon;
    at least four openings formed in said plurality of side surfaces extending into said substantially hollow interior;
    a card slidably mounted in one of said at least four openings; and
    a plurality of tray means rotatably mounted in the remaining at least four openings for rotational movement into and out of said remaining at least four openings.

12. The mouse pad and item holder of claim 11 wherein said card is a speed dial card and said three tray means include at least one rotatable tape dispenser, and at least one rotatable tray holding a removable paper means therein.

13. The mouse pad and item holder of claim 12 wherein said mouse tracking area is a separate mouse pad supported in a recessed area formed in said top surface, and said top surface slopes from a high point at one side surface to a low point at an opposed side surface with a palm support formed on said base at said low point.

14. The mouse pad and item holder of claim 13 wherein said top surface is sloped at an angle of between 5 and 15 degrees.

15. The mouse pad and item holder of claim 12 wherein said mouse tracking area is a laminate textured surface secured to said top surface, and said top surface slopes from a high point at one side surface to a low point at an opposed side surface, with a palm support formed on said base at said low point.

16. The mouse pad and item holder of claim 15 wherein said top surface is sloped at an angle of between 5 and 15 degrees.

* * * * *